United States Patent
Wixom et al.

(10) Patent No.: US 6,878,475 B2
(45) Date of Patent: Apr. 12, 2005

(54) MEMBRANE FOR FUEL CELL, AND FUEL CELL INCORPORATING THAT MEMBRANE

(75) Inventors: Michael Wixom, Ann Arbor, MI (US); Hanwei Lei, Ann Arbor, MI (US); Pu Zhang, Ann Arbor, MI (US); Junqing Ma, Ann Arbor, MI (US)

(73) Assignee: T/J Technologies, Inc., Ann Arbor, MI (US)

( * ) Notice: Subject to any disclaimer, the term of this patent is extended or adjusted under 35 U.S.C. 154(b) by 0 days.

(21) Appl. No.: 10/719,582

(22) Filed: Nov. 21, 2003

(65) Prior Publication Data

US 2004/0106030 A1 Jun. 3, 2004

Related U.S. Application Data

(60) Provisional application No. 60/428,542, filed on Nov. 22, 2002.

(51) Int. Cl.[7] .............................. H01M 8/10
(52) U.S. Cl. ................. 429/33; 429/314; 429/316; 252/62.2
(58) Field of Search ................. 429/33, 314, 316; 528/423, 99; 521/27; 252/62.2

(56) References Cited

U.S. PATENT DOCUMENTS

| | | | |
|---|---|---|---|
| 3,699,038 A | 10/1972 | Boom | 210/23 |
| 3,720,607 A | 3/1973 | Brinegar | 210/23 |
| 3,737,042 A | 6/1973 | Boom | 210/321 |
| 3,841,492 A | 10/1974 | Brinegar | 210/500 |
| 3,851,025 A | 11/1974 | Ram | 264/41 |
| 5,525,436 A | 6/1996 | Savinell et al. | 429/30 |
| 5,712,408 A | 1/1998 | Rasmussen et al. | 558/446 |
| 6,096,899 A | 8/2000 | Rasmussen et al. | 548/312.7 |
| 6,274,724 B1 | 8/2001 | Rasmussen et al. | 536/25.3 |
| 6,384,068 B1 | 5/2002 | Rasmussen et al. | 514/400 |
| 6,482,954 B1 | 11/2002 | Rasmussen et al. | 548/312.7 |
| 6,624,470 B1 | 9/2003 | Fujishima | 257/331 |
| 2001/0053823 A1 | 12/2001 | Rasmussen et al.. | 525/238 |
| 2002/0028952 A1 | 3/2002 | Rasmussen et al. | 548/334.1 |
| 2004/0062969 A1 * | 4/2004 | Sakaguchi et al. | 429/33 |

FOREIGN PATENT DOCUMENTS

WO    WO 99/52956    10/1999
WO    WO 01/51532 A1    1/2001

* cited by examiner

*Primary Examiner*—Laura Weiner
(74) *Attorney, Agent, or Firm*—Gifford, Krass, Groh, Sprinkle, Anderson & Citkowski, P.C.

(57) ABSTRACT

A proton exchange membrane for a fuel cell is prepared from a polyimidazole polymer having the formula:

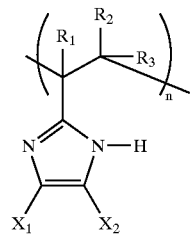

wherein $R_1$–$R_3$ are independently H, a halogen, an alkyl or a substituted alkyl. $X_1$ and $X_2$ are independently or an electron withdrawing group such as CN. The membrane may be doped to alter its conductivity. The membrane may be prepared from a copolymer of the polyimidazole. Also disclosed is a fuel cell incorporating the membrane.

27 Claims, 1 Drawing Sheet

MEMBRANE FOR FUEL CELL, AND FUEL CELL INCORPORATING THAT MEMBRANE

RELATED APPLICATION

This application claims priority of U.S. Provisional Patent Application Ser. No. 60/428,542 entitled "Fuel Cell" which was filed on Nov. 22, 2002.

FIELD OF THE INVENTION

This invention relates generally to fuel cells. More specifically, the invention relates to Proton Exchange Membrane Fuel Cells (PEMFC). In particular, the invention relates to a novel electrolyte membrane for use in fuel cells.

BACKGROUND OF THE INVENTION

Fuel cells are electrochemical devices in which electricity is produced by a direct reaction of a fuel and an oxidizer. Fuel cells are highly efficient, nonpolluting and silent in operation. Hence, fuel cells are coming into greater and greater use.

In the operation of a fuel cell, electrochemical oxidation and/or reduction reactions take place at the surface of the electrodes of the cell. Rates of the reactions increase with temperature, and as such there is a motivation to increase the operating temperature of fuel cells in order to enhance the reaction kinetics as well as electrode tolerance to species such as carbon monoxide, which are byproducts of fuel processing and which can operate to corrode, poison or otherwise degrade the electrode surface.

In conventional fuel cells, the membranes separating the electrodes rely heavily on water as a proton charge carrier. This reliance limits the operating temperature range of such fuel cells to less than 100° C. at atmospheric pressure. If higher temperature operation of such cells is desired, they must be pressurized. Even at temperatures below the boiling point of water it is necessary to maintain an adequate water balance in the fuel cell. Therefore, an additional humidification system and hydrating water are often required, and this increases the complexity of the fuel cell system and reduces the energy density.

In order to overcome these limitations associated with conventional fuel cell membranes, two classes of intermediate temperature (150–200° C.) electrolytic membranes have been proposed. The first class uses high thermostability polymers doped with an acid, and the second class is based on the use of solid acids such as cesium hydrogen sulfate. However, it has been found that problems are associated with both of these types of membranes. In particular, the acid-doped polymeric membranes contain high concentrations of unbound acid molecules that limit the fuel cell stability due to leaching of acid from the membrane. This leaching problem is extremely detrimental, particularly in small, portable fuel cell units where water may condense on the surface of the polymer at low temperatures during the time the fuel cell is out of service. The solid acid membranes have similar hydrolysis and stability limitations in the presence of liquid water. Furthermore, solid acid electrolytes suffer from processing difficulties that have limited membrane thickness to the millimeter range. This increases the parasitic resistance of the fuel cell and reduces its efficiency.

In view of the problems with prior art membranes, there is a need for fuel cell membranes that can sustain high and stable conductivity at temperatures above 150° C. without requiring additional humidification systems or hydrating water. As will be detailed hereinbelow, the present invention provides for the manufacture of fuel cells which include polymer electrolyte membranes fabricated from a novel class of polyimidazole polymers. These membranes have good conductivity for protons and can operate at ambient pressure utilizing liquid fuel such as methanol. These and other details of the invention will be apparent from the discussion and description which follow.

BRIEF DESCRIPTION OF THE INVENTION

There is disclosed herein a proton exchange membrane for a fuel cell. The proton exchange membrane comprises a polyimidazole polymer of the type:

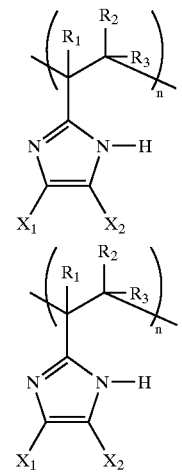

wherein $R_1$–$R_3$ are independently H, a halogen, alkyl, or substituted alkyl; and wherein $X_1$ and $X_2$ are independently H or an electron withdrawing group. Some electron withdrawing groups which may be used in particular embodiments of the invention are $NR_3^+$, $SR_2^+$, $NO_2$, $SO_2R$, $CN$, $SO_2Ar$, $COOR$, $NRCOR$, $OR$, $SR$, $C\equiv CR$, $Ar$, $CR=CR_2$; wherein R is: H, alkyl, or substituted alkyl, and wherein Ar is an aromatic group. In some embodiments, $X_1$ and $X_2$ are both CN.

In particular embodiments, the membrane may include a polar solvent dissolved therein. In other instances, the membrane may include a dopant, and one specific class of dopants comprises strong acids including organic acids and inorganic acids used either singly or in combination. In yet other embodiments, the membrane may comprise a copolymer of the polyimidazole, and in specific embodiments, the polyimidazole is copolymerized with an acidic monomer.

In yet other embodiments, the membrane may include a heteropolyacid, and in yet other embodiments, the membrane may include a silicon compound therein.

In accord with another aspect of the present invention, there is disclosed herein a hydroxyl ion exchange membrane for a fuel cell. This membrane comprises a polyimidazole polymer of the type:
wherein $R_1$–$R_3$ are independently H, a halogen, alkyl or substituted alkyl; and wherein $X_1$ and $X_2$ are independently H or an electron donating group.

Also disclosed are fuel cells having membranes of the type described herein.

DETAILED DESCRIPTION OF THE INVENTION

In accord with the present invention, there is provided a novel proton exchange membrane for use in fuel cells. The membrane is fabricated from a polyimidazole polymer having the general structure represented by Formula I hereinbelow.

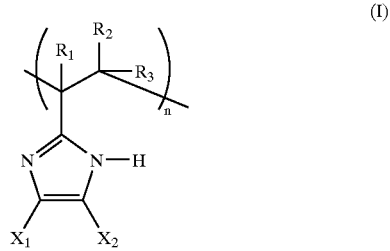

In the foregoing structure, $R_1$–$R_3$ are independently H, a halogen, an alkyl group or a substituted alkyl group. In general, the $R_1$–$R_3$ groups should be selected so as to avoid causing steric problems which could interfere with the proton conduction function of the membrane as will be described hereinbelow. In that regard, when one or more of $R_1$–$R_3$ are alkyl or substituted alkyl groups, they will preferably be $C_1$–$C_5$ groups. Typical substituents in a substituted alkyl may comprise hydroxyl groups, carboxyl groups, halogens, nitrogen or the like. In the foregoing structure, $X_1$ and $X_2$ are independently hydrogen or electron withdrawing groups which increase the acidity of the hydrogen bonded to the imidazole nitrogen. As is known in the art, such electron withdrawing groups include by way of illustration and not limitation $NR_3^+$, $SR_2^+$, $NO_2$, $SO_2R$, CN, $SO_2Ar$, COOR, NRCOR, OR, SR, C≡CR, Ar, CR=$CR_2$ and the like wherein R is independently: H, alkyl, or substituted alkyl, and wherein Ar is an aromatic group. One particularly preferred electron withdrawing group comprises CN. Polymers of this type, and methods for their synthesis, are shown in the prior art; however, the prior art has not employed materials of this type as proton exchange membranes for fuel cells. Some prior art references disclosing polymers of this type are U.S. Pat. Nos. 6,096,899; 6,274,724; 6,384,068; 6,624,470; 6,482,954; 6,384,068; 6,274,724 and 6,098,899. Further disclosure of this class of polymers is also found in published U.S. patent application U.S. Ser. No. 2001/0053823 A1. The disclosure of the foregoing patents and application is incorporated herein by reference.

Figure 1:
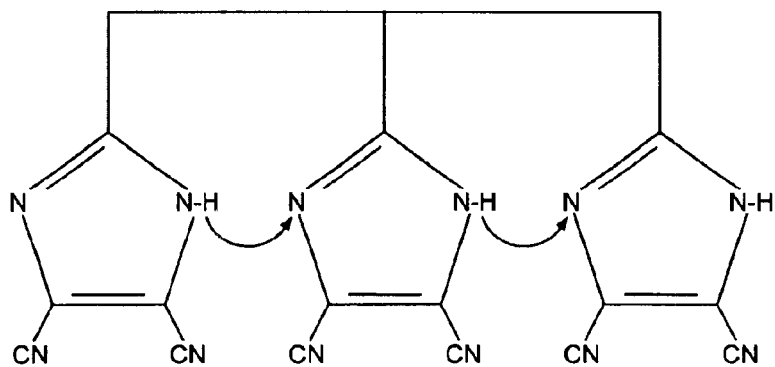
FIG. 1 is a schematic depiction showing a proposed mechanism of proton conduction in one embodiment of membrane of the present invention.

In the polymers of the present invention, electron withdrawing group(s) increases the acidity and lability of the proton on the imidazole ring. The large concentration of active imidazole groups allows protons to hop from one imidazole ring to the other to form a conduction chain. This process is illustrated in FIG. 1. The relatively flexible backbone of the polymer increases the mobility of the acidic group which further enhances proton conductivity. In addition to enhancing conductivity, the presence of the electron withdrawing groups enhances the solubility of the imidazole polymer in bases including aqueous ammonia and other amines. The polymer is also soluble in polar solvents including n-methylpyrrolidone (NMP), dimethylformamide (DMF), and acetonitrile. Solutions containing 20 to 50% polymer are sticky and can be drawn into filaments or readily cast into films. The mechanical properties of films of the present invention are typical of high molecular weight polymers but are highly dependent upon the role of hydrogen bonding. It has been found that the addition of polar electrolytes and solvents can alter the nature of the polymer from a brittle plastic to a tough rubbery gum. Gel permeation chromatography has indicated well-defined fractions of high molecular weight polymer in the range of 1,000,000. In the specific embodiment, polymers used in the present invention will have a molecular weight in the range of $5\times10^3$–$10^7$ daltons; although polymers with other molecular weights will be utilized in other instances. The molecular characteristics of the polymer of the present invention provide flexibility and durability which is superior to that achieved with prior art polymeric materials considered for PEMFC and other applications. Owing to the high nitrogen and low hydrogen content, thermal stability of the material is inherently high. Furthermore, the polymer can be cross linked to further enhance its stability and resistance to oxidation.

The high hydrogen bonding characteristics of the material of the present invention allows for the ready incorporation of polar solvent materials therein. Such solvents can serve to enhance the conductivity of the material and also moderate its physical properties. Among the polar solvents which can be incorporated into the polymers of the present invention are: N-methylpyrrolidone (NMP), dimethylformamide (DMF) and dimethylsulfoxide (DMSO). These solvents may be used individually or in combination with one another, or with other solvents.

The polymers of the present invention may be doped to further enhance their conductivity. In one embodiment, doping is accomplished by the use of a strong acid. In some instances, the acid may comprise an inorganic acid such as one or more of nitric acid, phosphoric acid, polyphosphoric acid, and sulfuric acid. In other instances, the acid may be an organic acid such as a carboxylic acid or a halocarboxylic acid. Dopants and/or solvents will increase conductivity for all polyimidazoles used in this invention; however they may be used with particular advantage when $X_1$, and $X_2$ are not electron withdrawing groups. Also, in such instances conductivity may be enhanced by copolymerizing the imidazole with the acidic monomers, as is described below.

Figure 2:
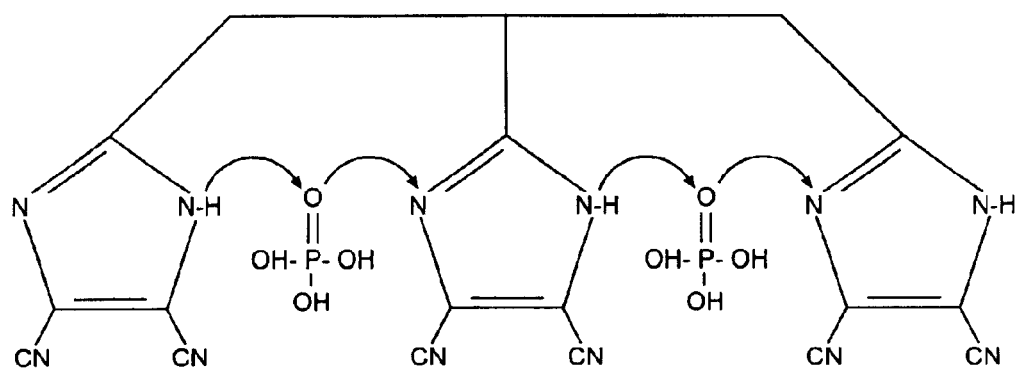
FIG. 2 is a schematic depiction showing a proposed mechanism of proton conduction in another embodiment of membrane of the present invention.

Referring now to FIG. 2, there is shown a schematic depiction of the use of phosphoric acid to enhance the proton conductivity of the imidazole polymers of the present invention. As will be seen, the phosphoric acid molecules intercalate the polymer chains. Hydrogen bonding sites strengthen interaction with acid dopants which reduces leaching. As was discussed above, the flexibility in the polymer chain allows the chain to deform so as to accommodate the phosphoric acid molecules. As shown in FIG. 2, the phosphoric acid acts as a bridge which enhances proton hopping and hence conductivity in the polymeric material.

Polyphosphoric acid may be utilized in a manner similar to phosphoric acid. Other acidic materials will also function in a manner similar to that of the phosphoric acid. Organic acids such as formic acid, acetic acid, oxalic acid, propionic acid, and higher molecular weight mono- and di-acids may be utilized, as may be mineral acids such as sulfuric acid, nitric acid and hydrochloric acid. In such instances, doping can be accomplished by mixtures of the foregoing acids. While the precise amount of acid used for doping the polymer will depend upon the particular application, the particular acid, and other such conditions, acid in the amount of 1–90% by weight of the polymer has been found to be effective for enhancing conductivity.

In those instances where acidic materials are incorporated into the polymers, such acidic materials will, in one embodiment, not exceed 1 mole equivalent of acid per monomer functional group. In general, larger amounts of acid tend to degrade the mechanical properties of the membrane and can leach out of the membrane in the presence of humidity.

The desired physical and mechanical characteristics of the polymer membranes of the present invention will depend upon particular fuel cell applications. In one particular application, the membranes of the present invention will comprise homogeneous, nonporous films having a thickness in the range of approximately 50–150 microns. The molecular weight of the polymer comprising these membranes will be approximately $10^6$ daltons. The membranes are readily cast from solvents utilizing conventional techniques. Membranes of this type function very well at temperatures as high as 250° C., and are thermally stable up to approximately 400° C. The electrical conductivity of this group of membranes is typically greater than 0.01 S/cm.

In a typical membrane preparation process, solutions of the polymer will be prepared in a solvent such as NMP and then cast onto a flat surface such as a glass plate. The cast solution will be extracted with water to remove solvent and form a film. Thickness of the film can be controlled by controlling the depth of the cast solution, and porosity can be controlled by controlling the concentration and rate of solvent extraction. In some instances, membrane thickness can be built up by repeatedly casting several layers of solvent onto preceding layers. Use of a multiple casting process allows for separate doping of sections of the resultant membrane. Once prepared, the dried membrane can be transferred to a support which may comprise a porous and/or flexible member.

In another preparation process, a membrane containing polyphosphoric acid was prepared by the following procedure. One gram of the polyvinazene powder was mixed with 2 grams of polyphosphoric acid at 100° C. for 2 hours with constant stirring until a homogeneous solution was obtained. The solution was allowed to cool to room temperature and then cast onto a glass plate using a film applicator. The film was maintained at a vacuum of 10 mm Hg at 50° C. for 48 hours during which time it hardened. The membrane was removed from the glass plate and utilized in a fuel cell.

Another polyphosphoric acid containing membrane was prepared by a process in which 1 gram of a vinyl dicyanoimidazole monomer was mixed with 5 grams of polyphosphoric acid at 100° C. for 2 hours with constant stirring until a homogeneous solution was obtained. The solution was cooled to 50° C. and 0.04 gram of a benzoyl peroxide polymerization initiator was added to the solution. The resultant mixture was stirred and slowly heated in steps of 10° C. for 2 hours up to a temperature of 80° C. and held at that temperature for 10 hours. Thereafter, the solution was held at 100° C. with constant stirring for 5 hours, and maintained at 100° C. for 1 hour without stirring. The solution was allowed to cool to room temperature and then cast onto a glass plate using a film applicator. The film was maintained at a vacuum of 10 mm Hg at 50° C. for 48 hours. This produced a hardened film which was removed from the glass plate and employed in a fuel cell.

The membrane material of the present invention may be further modified in accord with the principles thereof. For example, it is anticipated that performance characteristics of the membrane may be improved by incorporating heteropolyacids (HPA) thereinto. These materials have high proton conductivity and good thermal stability. The HPA can be incorporated into the membrane material by directly blending it with the polymer. In other instances, the HPA is first impregnated onto silica particles which are then blended into the polymer. Some HPAs which can be utilized in the present invention include monododecylphosphate, phosphotungstic acid, silicotungstic acid and phosphomolybdic acid. In a typical application, the HPA will be present in an amount of 1–90% by weight of the polymer.

In other embodiments of the present invention, the polymer may also include further additives that enhance the thermal and/or mechanical stability of the membrane. For example, particles of silica can be added to the polymer to act as water traps thereby enhancing proton conductivity at temperatures above 100° C. In other instances, silicon based compounds can be added to the polymer to produce a network of Si—O—Si linkages that produce a framework within the polymer that provides thermal and mechanical stability at elevated temperatures. For example, organosilicon compounds such as silicon alkoxides can be blended into the polymer, and through a low temperature sol gel process they will form a network of $(-SiO_2-)_n$ which extends through the polymer. In a particular example, polysilsesquioxane (POSS) with silanol functional groups (Si—OH) can be blended into the polymer and the Si—O—Si linkages can be formed by condensation reactions involving the loss of water. In another approach, POSS can be copolymerized with the polyimidazole monomer, and possibly other monomers, to form a material with improved thermal and mechanical stability.

In yet other embodiments of the present invention, the polyimidazole monomer can be copolymerized with acidic monomers, and in particular vinyl acidic monomers, to produce a resultant copolymer of polyimidazole which has enhanced proton conducting properties. Incorporation of acidic monomers can provide acidic sites either proximate to or bonded to the backbone of the imidazole polymer, which acidic sites enhance the proton conductivity in a manner similar to that shown in FIG. 2. This approach may be employed with particular advantage in those instances in which the polyimidazole does not have any electron withdrawing groups at the $X_1$ or $X_2$ positions. Some vinyl based acidic monomers which may be utilized in this approach include: vinyl sulfonic acid, styrene sulfonic acid and vinyl phosphonic acid.

For example, in one experiment, 0.5 grams of the polyimidazole polymer of the present invention and 0.5 grams of vinyl phosphonic acid were dissolved in 10 ml of NMP. 0.04 grams of a benzoyl peroxide initiator was added. The material was heated in an oil bath at 60° C. for 24 hours with constant stirring. The solvent was then removed under 12 mm Hg of vacuum at 80° C. and the resultant product dried for 24 hours at 100 C. This produced a copolymer of the polyimidazole and polyvinyl phosphonic acid.

Conductivity characteristics of the polymer may also be controlled by chemical modification or treatment of the backbone portion of the polymer. For example, it is anticipated that halogenation of the backbone of the polymer will enhance thermal and chemical stability. In particular, one or more of the $R_1$–$R_3$ sites on the polymer backbone may comprise fluorine. Fluorination can be accomplished by treatment of the monomer prior to polymerization, or by a post-polymerization reaction. Such fluorination will enhance the stability and processing characteristics of the resultant polymer. In one embodiment of this aspect of the present invention, a filly fluorinated polymer backbone ($R_1$, $R_2$, $R_3$=F) will be prepared by polymerizing appropriate fluorinated monomers.

In another instance, the backbone may be modified to add bridging imide groups thereto. These bridging groups can function to "lock" the imidazole rings of the polymer into favorable geometries which promote proton conduction. In addition, they can directly participate in and facilitate proton transfer.

In yet other embodiments of the present invention, the imidazole rings of the polymer may be modified to introduce acid groups thereonto. These acid groups will enhance conductivity in a manner similar to that described with reference to FIG. 2. Materials of this type will be prepared by reacting a compound such as an alkyl or aryl sulfonate with the polymer so that the acidic group attaches to one of the imidazole nitrogens. For example, alkylsulfonated materials can be synthesized by a reaction between a compound such as 1,3-propanesulfone and the reactive N—H group of the polymer. This produces a sulfopropylated polymer.

Another approach to adding acid groups to the imidazole ring involves the use of arylsulfonated reactants. One such reaction may be carried out utilizing a species such as sodium(4-bromomethyl)benzenesulfonate. Likewise, the imidazole rings may be reacted with phosphoric acid derived material such as chloroethyl-phosphoric acid to produce phosphorylated polymers. In all of such instances, the presence of active acidic groups on the polymer chain enhances proton conductivity. In materials of this type, proton conductivity is provided by the acidic group and/or the imidazole hydrogen. Polymers of this type may have all, or only a portion of, the imidazole rings modified by the acidic material.

In accord with another aspect of the present invention, membranes for fuel cells are modified to provide for conductivity of hydroxyl($OH^-$) ions in a manner similar to the proton conduction of the membranes. There are a number of approaches which may be implemented to provide for hydroxyl ion conductivity. In a first approach, the membrane is impregnated with an alkaline material such as KOH to yield an alkaline exchange membrane. In general, the concentration of the alkaline additive will be sufficient so as to provide sufficient hydroxyl ions to correspond to the number of imidazole rings in the polymer. Typically, this concentration will be in the range of 1–90% by weight of the polymer.

In another approach to providing for hydroxyl ion conductivity, the polymer material itself will be chemically modified by grafting ionic functional groups thereonto. Such functional groups can include amines such as trimethylamine, triethylamine, and the like. Such grafting may be carried out by chemical techniques well known to those skilled in the art. In another approach, the functional groups providing for hydroxyl ion conductivity will be on another monomer which is copolymerized with the vinylimidazole. Such functional groups will typically include quaternary amines, aromatic alcohols, and in particular aromatic alcohols having electron donating groups bound thereto, and other such materials well known to those of skill in the art.

The foregoing approaches to providing hydroxyl ion conductivity may be implemented using the polyimidazole polymers described above. However, one specific group of membranes are based upon polyimidazole polymers of the type:
wherein $R_1$–$R_3$ are as described above, but $X_1$ and $X_2$ are independently hydrogen or an electron donating group. Some particular electron donating

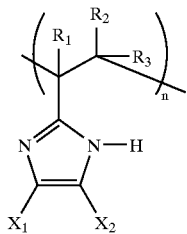

groups include: $O^-$, $COO^-$, $CR_3$ and D, wherein R is hydrogen or an alkyl.

In view of the teaching presented herein, yet other modifications and variations of the membranes of the present invention may be implemented. The foregoing drawings, discussion and description are illustrative of specific embodiments of the present invention, but they are not meant to be limitations upon the practice thereof. It is the following claims, including all equivalents, which define the scope of the invention.

What is claimed is:

1. A fuel cell having a proton exchange membrane, said membrane comprising a polyimidazole polymer of the type:

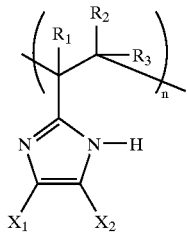

wherein n is a positive integer, $R_1$–$R_3$ are independently H, a halogen, alkyl, or a substituted alkyl; and wherein $X_1$ and $X_2$ are independently H or an electron withdrawing group; said membrane including a silicon compound therein.

2. The fuel cell of claim 1, wherein $X_1$ and $X_2$ are each CN.

3. The fuel cell of claim 1, wherein said membrane further includes a polar solvent dissolved therein.

4. The fuel cell of claim 3, wherein said polar solvent is selected from the group consisting of N-methylpyrrolidone, dimethylformamide, dimethylsulfoxide, and combinations thereof.

5. The fuel cell of claim 1, wherein said membrane further includes a dopant therein.

6. The fuel cell of claim 1, wherein said dopant comprises a strong acid.

7. The fuel cell of claim 6, wherein said strong acid is selected from the group consisting of nitric acid, phosphoric acid, polyphosphoric acid, sulfuric acid, and combinations thereof.

8. The fuel cell of claim 6, wherein said strong acid is an organic acid.

9. The fuel cell of claim 1, wherein said membrane comprises a copolymer of said polyimidazole polymer and another material.

10. The fuel cell claim 1, wherein $R_1$–$R_3$ are independently H or a $C_1$–$C_5$ alkyl.

11. The fuel cell of claim 1, wherein $X_1$ and $X_2$ are independently: $NR_3^+$, $SR_2^+$, $NO_2$, $SO_2R$, $CN$, $SO_2Ar$, $COOR$, $NRCOR$, $OR$, $SR$, $C\equiv CR$, $Ar$, $CR=CR_2$; wherein R is: H, alkyl, or substituted alkyl, and wherein Ar is an aromatic group.

12. The fuel cell of claim 1, wherein the polymer comprising said membrane has a molecular weight in the range of $5\times10^3$–$10^7$ daltons.

13. The fuel cell of claim 1, wherein said membrane has a thickness in the range of 25–200 microns.

14. The fuel cell of claim 1, wherein said membrane has an electrical conductivity greater than 0.01 S/cm.

15. The fuel cell of claim 1, wherein said membrane comprises a polyimidazole polymer which is copolymerized with an acidic monomer.

16. The fuel cell of claim 15, wherein said acidic monomer is an acidic vinyl monomer.

17. The fuel cell of claim 16, wherein said acidic vinyl monomer is selected from the group consisting of: vinyl phosphonic acid, vinyl sulfonic acid, styrene sulfonic acid, and combinations thereof.

18. The fuel cell of claim 1, wherein $R_1$–$R_3$ are fluorine.

19. The fuel cell of claim 1, wherein said membrane includes a heteropolyacid.

20. The fuel cell of claim 19, wherein said heteropolyacid is selected from the group consisting of: monododecylphosphate, phosphotungstic acid, silicotungstic acid, phosphomolybdic acid, and combinations thereof.

21. The fuel cell of claim 19, wherein said heteropolyacid is adsorbed on a carrier which is dispersed in said polymer.

22. The fuel cell of claim 21, wherein said carrier comprises silica.

23. The fuel cell of claim 1, wherein said silicon compound comprises $SiO_2$.

24. The fuel cell of claim 1, wherein said silicon compound comprises a network of —Si—O—Si— which extends through at least a portion of said membrane.

25. A fuel cell having a proton exchange membrane, said membrane comprising a polyimidazole polymer of the type:

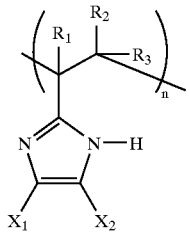

wherein n is an integer, $R_1$–$R_3$ are fluorine; and wherein $X_1$ and $X_2$ are independently H or an electron withdrawing group.

26. A fuel cell having a proton exchange membrane, said membrane comprising a polyimidazole polymer of the type:

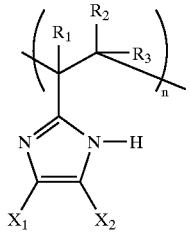

wherein n is an integer, $R_1$–$R_3$ are independently H, a halogen, alkyl, or a substituted alkyl; and wherein $X_1$ and $X_2$ are independently H or an electron withdrawing group; said membrane including a heteropolyacid.

27. The fuel cell of claim 26, wherein said heteropolyacid is selected from the group consisting of: monododecylphosphate, phosphotungstic acid, silicotungstic acid, phosphomolybdic acid, and combinations thereof.

* * * * *